March 9, 1943.  W. H. EMERSON ET AL  2,313,056
FEEDING APPARATUS FOR PLASTIC MATERIAL
Filed March 9, 1940  2 Sheets-Sheet 1
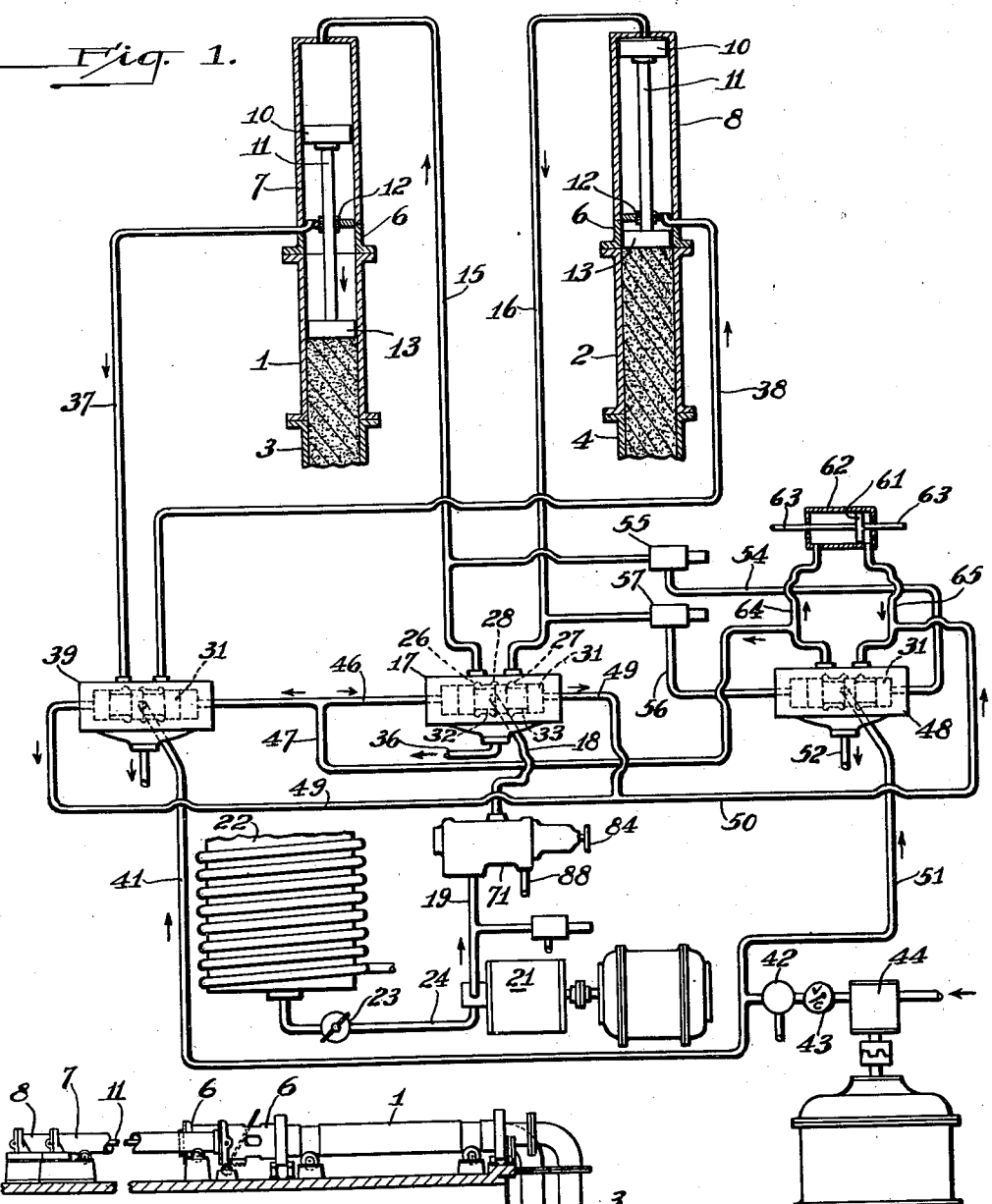
Fig. 1.
Fig. 2.
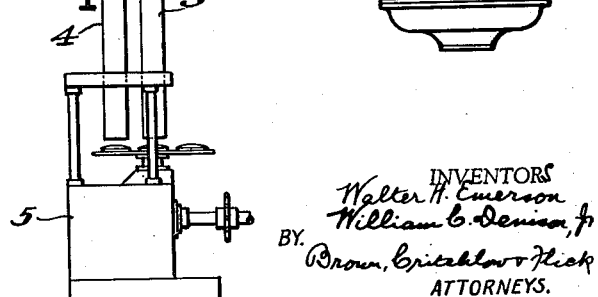
WITNESSES.
A. B. Wallace.
V. A. Peckham.
INVENTORS
Walter H. Emerson
William C. Denison, Jr.
BY Brown, Critchlow & Flick
ATTORNEYS.

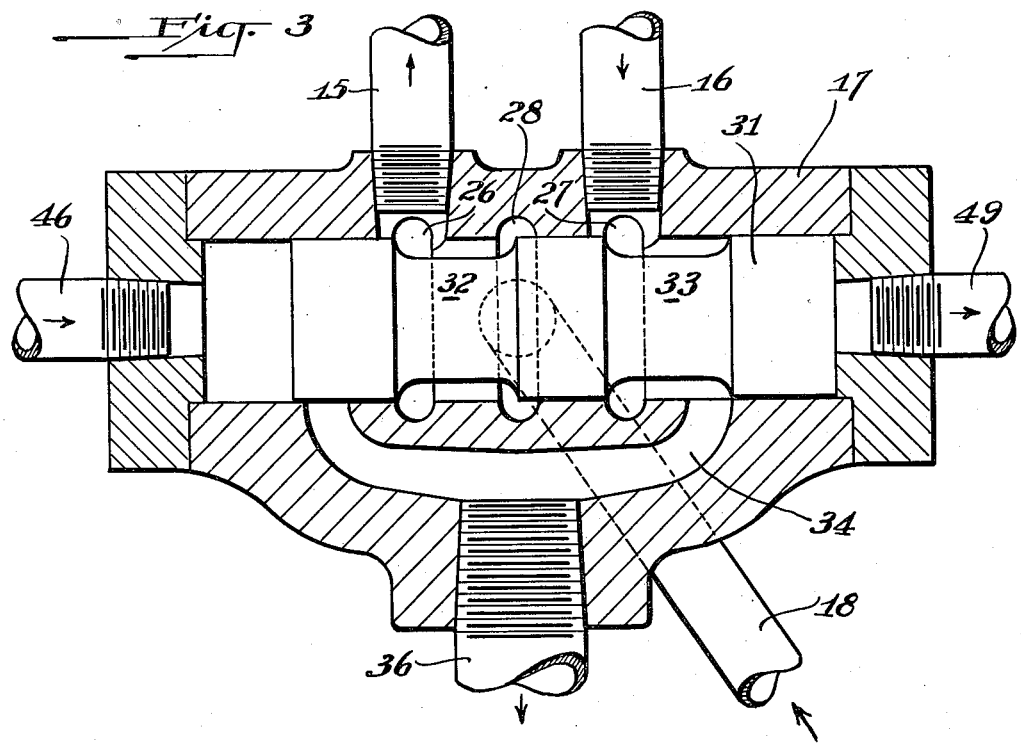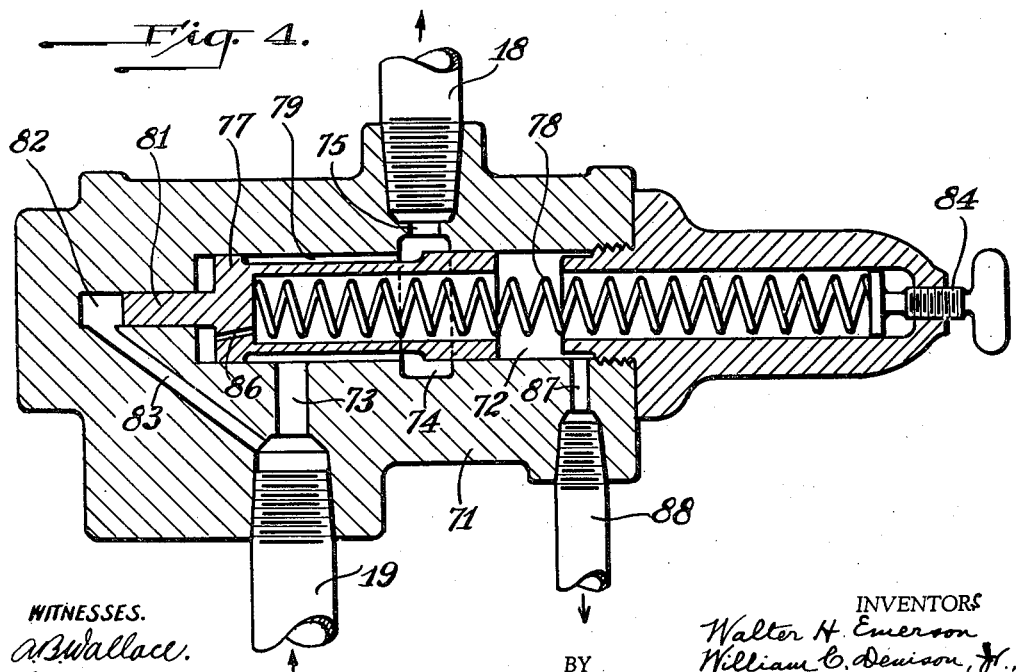

UNITED STATES PATENT OFFICE 2,313,056

FEEDING APPARATUS FOR PLASTIC MATERIAL

Walter H. Emerson, East Liverpool, and William C. Denison, Jr., Columbus, Ohio

Application March 9, 1940, Serial No. 323,166

17 Claims. (Cl. 25—22)

This invention relates to apparatus for feeding plastic material to a cut-off mechanism by which blanks are severed from the material, and more particularly to such feeding apparatus for use with automatic dinnerware-manufacturing machines.

In the use of automatic machinery for making dinnerware, disc-like blanks or bats of clay that have been cut from a roll of clay are placed on molds over which the bats are shaped in subsequent operations. In the manufacture of high-grade dinnerware by these machines it is highly desirable that the bats be as thin as possible and all of the same diameter and thickness. In one type of apparatus, such as that shown in the copending application of Walter H. Emerson, Serial No. 328,638, filed April 9, 1940, a cylindrical roll or column of clay is extruded from the lower end of a vertical conduit and discs of the clay are periodically cut from the downwardly moving column. Each disc or bat falls upon a mold temporarily positioned a short distance below it, and the mold is then indexed first to a station where the bat is pressed into shape over or in the mold and then to a station where the shaped bat is jiggered. As the cut-off mechanism operates at a uniform speed because it must be synchronized with the indexing of the molds, the only way to produce bats of uniform thickness is to extrude the clay from the lower end of the feed conduit at a constant rate. Heretofore there has been no satisfactory means for doing this because the resistance of the clay to forward movement varies continuously and sometimes to a large extent, whereby different amounts of the clay would emerge from the feed conduit per given unit of time. Another difficulty has been that even though several bats might have substantially the same thickness, they might not contain equal amounts of clay because of uneven compacting of the clay in the roll from which the bats were cut.

It is among the objects of this invention to provide apparatus for feeding a plastic material body of uniform density to a given location at a uniform rate of speed, automatically and continuously.

In accordance with this invention plastic material is extruded from one end of a tubular member by a plunger which is driven forward through the tubular member by suitable means, such as a fluid pressure motor. A liquid is delivered under pressure to such a motor by a fluid pressure source, such as a pump, and metering means is provided for maintaining constant the volumetric delivery of the liquid by the pump so that the plunger will be driven ahead by the motor at a uniform rate regardless of variations in the resistance of the plastic material to moving forward. As a result, the plastic material is extruded from the tubular member at a uniform rate of speed. The great pressure required to extrude the material in this manner helps to compact it into a mass of uniform density. Preferably, there are two tubular members for feeding plastic material and they are arranged so that as soon as one is emptied the other automatically starts feeding. This my be done by fluid pressure acting through valves and pipes and by which one of the plungers is moved backward so that its associated tubular member can be recharged with plastic material while the other plunger is moving forward to extrude material from its tubular member.

The preferred embodiment of the invention is illustrated in the accompanying drawings in which Fig. 1 is a diagrammatic view of our feeding apparatus for plastic material; Fig. 2 is a reduced diagrammatic side view of the feeding apparatus connected to an automatic dinnerware machine; Fig. 3 is an enlarged longitudinal section through one of the four-way valves; and Fig. 4 is a similar section through the pressure build-up valve by which the volumetric delivery of the pump is maintained constant.

Referring to Fig. 1 of the drawings, a pair of tubular magazines 1 and 2 that are adapted to be filled with plastic material such as clay, from a pug mill at another location, are detachably connected at their front ends to tubular conduits 3 and 4, respectively, which terminate in vertical portions carrying at their lower ends the cut-off mechanism (not shown) of an automatic dinnerware machine 5 (Fig. 2), such as shown in the previously mentioned copending application of Walter H. Emerson. It will be understood that this apparatus can also be used to deliver clay to a jiggerman. The rear ends of the magazines are detachably connected to tubular housings 6 projecting forward from the front ends of a pair of fluid pressure cylinders 7 and 8. Disposed in each cylinder is a piston 10 which is connected by a piston rod 11, slidably mounted in a packing gland 12 in the front of the cylinder, to a plunger 13 disposed in the housing 6 or the magazine connected thereto. By moving a piston forward in its cylinder the associated plunger is pushed through the adjoining magazine from which it forces clay into the conduit at its front end and thereby causes clay to extrude from the lower or outlet end of the conduit.

To move the pistons forward a liquid under pressure, preferably oil, is introduced into the rear ends of cylinders 1 and 2 by pipes 15 and 16, respectively. These two pipes are connected to the side of a precision four-way main valve 17 provided centrally with an inlet connected by pipes 18 and 19 to an electrically driven variable volume piston pump 21 that pumps the oil from a steam heated tank 22 through a filter 23 and a pipe 24. It will be noted that only one pump is required for moving two different pistons forward. As shown in Fig. 3, pipes 15 and 16 open into annular recesses 26 and 27, respectively, in the inner wall of the casing of valve 17, and inlet pipe 18 opens into a similar recess 28 midway between the first two. An axially reciprocable valve member 31 is disposed in the valve casing and is provided with spaced relatively wide peripheral recesses 32 and 33 between cylindrical portions that snugly but slidably engage the inner wall of the casing.

When the valve member is at the right-hand end of the casing as seen in Fig. 1, its recess 32 connects inlet recess 28 with casing recess 26 and pipe 15, and the other valve member recess 33 connects the remaining casing recess 27 and pipe 16 with a branched passage 34 that extends through the side wall of the casing and is connected by a pipe 36 to tank 22. When the valve member is moved to the opposite end of the casing, inlet recess 28 is connected by recess 33 with casing recess 27, and the other casing recess 26 is connected by recess 32 with another branch of passage 34 leading to tank pipe 36. Thus, when the rear end of one cylinder, 7 or 8, is connected with the pressure inlet of valve 17, the rear end of the other cylinder is connected with the tank. As will now be shown, the front end of the first cylinder is at that time connected with the tank while the front end of the other cylinder is connected with another source of fluid under pressure so that while the piston in the first cylinder is moving forward the other piston is moved backwardly much more rapidly so that its clay magazine can be removed and recharged before the first cylinder is emptied.

Accordingly, the two pipes 37 and 38 that are connected to the front ends of cylinders 7 and 8, respectively, are connected to the side of a four-way main valve 39 that is made the same as valve 17. The pressure inlet of this valve is connected by a pipe 41, relief valve 42 and check valve 43 to a pump 44 that also delivers fluid under pressure, preferably oil, from tank 22. A separate pump is used for retracting the piston in order not to interfere with the uniform delivery of oil from pump 21 and also to permit rapid retraction of the pistons. Fig. 1 illustrates the apparatus at a time in its cycle in which oil is being admitted through pipe 15 to the back of cylinder 7 in order to force clay from magazine 1, and in which pressure fluid has been supplied through pipe 38 to the front end of cylinder 8 to retract the piston therein so that the emptied magazine 2 could be removed and recharged with clay and then put back in place as shown to await the emptying of magazine 1. At this time the movable valve member 31 in valve 39 is at the left end of the casing so that pipe 37 is open to the tank, and pipe 38 is connected with pump 44 through pipe 41.

To automatically trip valves 17 and 39 at the proper times in the clay-feeding cycle the adjacent ends of the two valves are connected by pipes 46 and 47 to the side of a four-way pilot valve 48, and the other two ends of the valves are also connected by pipes 49 and 50 to the side of valve 48. This valve is made the same as the two main valves 17 and 39 and its pressure inlet is connected by a pipe 51 to pump 44. When the movable valve member 31 within pilot valve 48 is at the right-hand end of the casing, as shown in Fig. 1, the pressure inlet is connected with pipe 47 leading to the adjacent ends of the other two valves, and their other two ends are connected through valve 48 and a pipe 52 to the tank. The reverse is true when the valve member is at the other end of valve 48.

In order to move this valve member in valve 48 one end of its casing is connected by a pipe 54 and a pressure tripping valve 55 to pipe 15 connected to the rear end of cylinder 7, and the other end of the casing is connected by another pipe 56 and pressure tripping valve 57 to pipe 16 communicating with the rear end of the other cylinder. When the forwardly moving piston 10 in one of the cylinders reaches the forward limit of its stroke, which occurs when the clay has been exhausted from the associated magazine, the fluid pressure behind the piston builds up until it breaks through the pressure tripping valve connected thereto and drives the movable valve member 31 in pilot valve 48 to the opposite end of the casing. This immediately trips the two main valves 17 and 39 and thereby connects with the tank the rear end of the cylinder that tripped the pilot valve and simultaneously connects the front end of that cylinder with pump 44 in order to retract its piston 10. At the same time the rear end of the other cylinder is connected with pump 21 and its front end is connected with the tank so that its piston 10 can be driven ahead to force clay from the magazine associated therewith.

Fig. 1 shows the apparatus at a time in its cycle soon after the oil in pipe 16, whose pressure had been increased momentarily when the piston in cylinder 8 reached its front wall, broke through pressure tripping valve 57 and forced the movable valve member 31 to the right in pilot valve 48, whereupon the movable valve members in main valves 17 and 39 were moved to the positions shown and the piston in cylinder 8 was retracted while the piston in cylinder 7 was started forward.

Although the valves in this apparatus have been shown to be fluid actuated, it will be understood that they can be actuated electrically or mechanically.

The clay is fed from conduits 3 and 4 to cut-off apparatus such as shown in the copending application of Walter H. Emerson, Serial No. 311,719, filed December 30, 1939. As there explained, when the clay has been exhausted from one magazine and clay starts issuing from the conduit connected to the other magazine, the cut-off mechanism must be synchronized with the periods of rest of the molds indexed into position beneath the second conduit. This is done automatically by a synchronizing mechanism actuated by a piston in a small cylinder. This piston 61 is shown in Fig. 1 in a cylinder 62 through the ends of which piston rods 63 extend. The piston is moved from one end of the cylinder to the other when pilot valve 48 is tripped, a pair of pipes 64 and 65 connecting the pilot valve to the cylinder for this purpose. By changing the setting of pump 21 the rate of clay extrusion can be changed in order to change the thickness of the bats cut from the clay column, or to maintain the same thickness of bats when the rate of operation of the ware-forming machine is changed.

Another feature of this invention is that the volumetric delivery of pump 21 is maintained constant at all times so that the rate of extrusion of clay from conduits 3 and 4 will remain constant. Accordingly, pipes 18 and 19 between the pump and main valve 17 are connected by what may be called a pressure build-up valve 71. As shown in Fig. 4, this valve has a casing provided with an axial bore 72 connected by a lateral passage 73 near one end to pipe 19 from the pump. Spaced longitudinally from this passage the wall of the bore is provided with an annular recess 74 that opens into another passage 75 connected by pipe 18 to valve 17. Slidable axially within the bore is a hollow valve plunger 77 that is biased by a coil spring 78 toward the end of the bore adjacent passage 73, in which position the plunger would close the valve by shutting off communication between the two passages. However, the plunger is provided with an annular recess 79 that is long enough to connect the two passages when the plunger is moved away from the end of the bore as it is shown in Fig. 4. To move the plunger for this purpose its closed end is provided with an extension 81 that fits snugly but slidably within an axial extension 82 of the bore, and the outer end of this bore extension is connected by a duct 83 to inlet passage 73.

Before pump 21 is started in operation, valve plunger 77 closes the valve because it is held against the adjacent end wall of bore 72 by the coil spring. When the pump starts it builds up pressure in pipe 19, passage 73 and duct 83 until the pressure in the outer end of the bore extension 82 is sufficient to move the plunger far enough inwardly against the resistance of the coil spring to have its recess 79 connect inlet and outlet passages 73 and 75. This places the pump in communication with valve 17. The amount of fluid pressure required to thus move the plunger can be regulated by an adjustable screw at 84 at the outer end of the coil spring. To prevent the closed end of plunger 77 from having a dashpot effect in connection with the adjacent end of bore 72, that end of the plunger is provided with a small vent 86. The unappreciable amount of leakage that may occur in the valve is taken care of by a lateral passage 87 and a pipe 88 leading to the tank.

The clay's variation in resistance to moving forward through the magazine and conduit, and variations in resistance due to other causes such as leakage of packings, etc., vary the pressure of the oil in the associated cylinder. Without pressure build-up valve 71 these variations in oil pressure would be transmitted back to pump 21 where they would vary the amount of leakage that inevitably occurs in such a pump. This would affect the volumetric delivery of the pump directly, so that every time the clay offered more resistance to extrusion less oil would be pumped into the cylinder and the rate of extrusion would decrease. Conversely, as the general resistance of the clay to extrusion decreases, which it does as the column of clay in the magazine becomes shorter, oil would be pumped into the cylinder at a faster rate because the pump leakage would be less.

However, these variations in oil delivery do not occur when pressure build-up valve 71 is used. For any given oil pressure there is a certain amount of leakage at the pump and therefore a definite volume of oil delivered to one of the cylinders per minute. If the oil pressure between the pump and valve 71 tended to increase, which would increase the leakage and decrease the delivery, the increased pressure in the outer end of bore extension 82 will move valve plunger 77 further to the right and thereby make a larger passage through the valve which would immediately reduce the pressure to its original value so that the pump leakage and delivery would remain constant. Or, if the oil pressure tended to decrease, the valve plunger would start to move to the left which would reduce the size of the valve passage and thereby increase the pressure to normal. It will be understood that in actual practice there is very little, if any, movement of the plunger. It generally remains balanced in the predetermined position which it takes when the apparatus starts operating, because there is nothing to change the oil pressure between pump and valve. This position, which is determined in part by adjustable spring 78, maintains the oil pressure in pipe 19 greater than any pressure encountered by the oil in pipe 18. Because of this, oil pressures on the outlet side of the valve, which vary, do not affect or control the operations of the valve in any way, and therefore the volume of oil delivered to the cylinders per minute does not change with the pressure changes in pipe 18.

In our clay-feeding apparatus that is being used now the plungers 13 exert considerable pressure per square inch on the adjoining faces of the clay in the magazines. This keeps the clay firmly compacted so that bats of equal thickness sliced therefrom weigh the same amounts.

Apparatus constructed in accordance with this invention not only delivers plastic material of uniform density to a cut-off mechanism at a constant rate, thereby permitting dinnerware and the like of uniform grade to be made, but it also delivers the material continuously, due to the automatic change-over from one magazine to the other as soon as the first has been emptied.

In the specification and claims the words "uniform" and "constant" are used. These are to be understood in their practical every-day sense of meaning substantially or practically uniform or constant.

According to the provisions of the patent statutes, we have explained the principle and construction of our invention and have illustrated and described what we now consider to represent its best embodiments. However, we desire to have it understood that, within the scope of the appended claims, the invention may be practiced otherwise than as specifically illustrated and described.

We claim:

1. Continuously operating clay feeding apparatus comprising a pair of pistons each adapted to be connected to the back of a plunger, a hydraulic cylinder housing each piston, a pump for pumping liquid into said cylinders behind the pistons to force them ahead, a valve for connecting the pump alternately with each cylinder, means for maintaining the pump operating at a constant pressure in order to deliver said liquid to the cylinders at a uniform rate, and means actuated by the increase in hydraulic pressure behind a piston that has reached the forward limit of its stroke for tripping said valve to connect the pump with the other cylinder.

2. Continuously operating clay feeding apparatus comprising a pair of pistons each adapted to be connected to the back of a plunger, a hydraulic cylinder housing each piston, a pump for pumping liquid into said cylinders behind the pistons to force them ahead, a valve for connecting the pump alternately with each cylinder, means for maintaining the pump operating at a constant pressure in order to deliver said liquid to the cylinders at a uniform rate, means actuated by the increase in hydraulic pressure behind a piston that has reached the forward limit of its stroke for tripping said valve to connect the pump with the other cylinder, means for delivering fluid under pressure to the front end of each cylinder to retract the pistons, a valve for connecting said fluid-delivering means alternately with each cylinder, and means operatively connecting said pressure-actuated means with said last-mentioned valve whereby the valve is tripped simultaneously with said first-mentioned valve.

3. Apparatus for feeding plastic clay to cut-off mechanism at a uniform rate for making pottery ware of uniform character, comprising a tubular member adapted to be charged with plastic material, a plunger for pushing said material out of one end of said member, a piston for moving the plunger, an hydraulic cylinder housing the piston, a pump for pumping liquid into said cylinder to force the plunger forward, a valve casing provided with a passage through which said liquid is pumped to said cylinder, means in said casing responsive to the pressure of the liquid delivered to the casing for varying the size of the passage, and means for adjusting the size of said passage to maintain the pressure on the liquid between the pump and valve casing greater than on the liquid leaving the valve casing whereby to maintain the volumetric delivery of the pump substantially constant regardless of varying pressures on the liquid leaving the valve casing.

4. Apparatus for feeding plastic clay to cut-off mechanism at a uniform rate for making pottery ware of uniform character, comprising a tubular member adapted to be charged with plastic material, a plunger for pushing said material out of one end of said member, a piston for moving the plunger, an hydraulic cylinder housing the piston, a pump for pumping liquid into said cylinder to force the plunger forward, a valve casing through which said liquid is pumped to said cylinder and which is provided with a bore from which an inlet and an outlet passage extend radially at axially spaced points, the inlet end of the bore being provided with an extension, a valve plunger slidably mounted in said bore and provided with a stem projecting into said extension, and means for biasing said valve plunger toward said extension, said casing having a duct connecting said inlet and the outer end of said extension, and said valve plunger having a passage connecting the inner ends of said inlet and outlet when the valve plunger is moved away from said extension by fluid pressure therein, whereby the pump is maintained operating at a substantially constant pressure.

5. Continuously operating clay feeding apparatus comprising a pair of pistons each adapted to be connected to the back of a plunger, a hydraulic cylinder housing each piston, a pump for pumping liquid into said cylinders behind the pistons to force them ahead, a valve for connecting the pump alternately with each cylinder, means for maintaining the pump operating at a constant pressure in order to deliver said liquid to the cylinders at a uniform rate, and means actuated by the increase in hydraulic pressure behind a piston that has reached the forward limit of its stroke for tripping said valve to release that pressure and connect the pump with the other cylinder.

6. Continuously operating clay feeding apparatus comprising a pair of pistons each adapted to be connected to the back of a plunger, a hydraulic cylinder housing each piston, a pump for pumping liquid into said cylinders behind the pistons to force them ahead, a valve for connecting the pump alternately with each cylinder, means for maintaining the pump operating at a constant pressure in order to deliver said liquid to the cylinders at a uniform rate, means actuated by the increase in hydraulic pressure behind a piston that has reached the forward limit of its stroke for tripping said valve to release that pressure and connect the pump with the other cylinder, means for delivering fluid under pressure to the front end of each cylinder to retract the pistons, a valve for connecting said fluid-delivering means alternately with each cylinder, and means operatively connecting said pressure-actuated means with said last-mentioned valve whereby the valve is tripped simultaneously with said first-mentioned valve to release the pressure from the front end of said other cylinder and connect said fluid-delivering means with the front end of the first cylinder.

7. Continuously operating clay feeding apparatus comprising a pair of pistons each adapted to be connected to the back of a plunger, a hydraulic cylinder housing each piston, a valve provided with an exhaust port, a pair of pipes connecting the valve with the back ends of the cylinders, a liquid pump connected to the valve, the valve being adapted to connect the pump with either of said pipes and to connect the other pipe with said exhaust port, means for maintaining the pump operating at a substantially constant pressure, a second valve provided with an exhaust port, a second pair of pipes connecting the second valve with the front ends of the cylinders, means for delivering fluid under pressure to the second valve, said second valve being adapted to connect said fluid-delivering means with the pipe leading to the front end of the cylinder connected with said first exhaust port and to connect its exhaust port with the pipe leading to the front end of the other cylinder, a pilot valve connected to said first pair of pipes and adapted to be operated by abnormal liquid pressure caused by one of said pistons reaching the forward limit of its stroke, and means for operatively connecting the pilot valve with said other valves for tripping them when the pilot valve is operated, whereby said pump and fluid-delivering means are each disconnected from the cylinders with which they were first connected and connected with the other cylinders.

8. Continuously operating clay feeding apparatus comprising a pair of pistons each adapted to be connected to the back of a plunger, a hydraulic cylinder housing each piston, a valve provided with an exhaust port, a pair of pipes connecting the valve with the back ends of the cylinders, a liquid pump connected to the valve, the valve being adapted to connect the pump with either of said pipes and to connect the other pipe with said exhaust port, means for maintaining the pump operating at a substantially constant pressure, a second valve provided with an exhaust port, a second pair of pipes connecting the second valve with the front ends of the cylinders, means for delivering fluid under pressure to the second valve, said second valve being adapted to connect said fluid-delivering means with the pipe leading to the front end of the cylinder connected with said first exhaust port and to connect the exhaust port with the pipe leading to the front end of the other cylinder, a pilot valve connected to said first pair of pipes and adapted to be operated by abnormal liquid pressure caused by one of said pistons reaching the forward limit of its stroke, a pair of pressure bypass valves between the pilot valve and said first pair of pipes for permitting only high pressure liquid to pass to the pilot valve but allowing low pressure liquid to return to said pipes, and means for operatively connecting the pilot valve with said other valves for tripping them when the pilot valve is operated, whereby said pump and fluid-delivering means are each disconnected from the cylinders with which they were first connected and connected with the other cylinders.

9. Fluid actuated apparatus for continuously supplying clay to an automatic jiggering machine, comprising a pair of tubular members adapted to be charged with clay, plungers for pushing the clay out of said members, hydraulic pressure operated means for moving the plungers forward alternately independently of each other at a uniform speed, and means actuated by a momentary increase in said hydraulic pressure caused by a plunger reaching the forward limit of its stroke for retracting that plunger so that its tubular member can be recharged with clay while the other plunger is forcing clay out of the other tubular member.

10. Fluid actuated apparatus for continuously supplying clay to an automatic jiggering machine, comprising a pair of tubular members adapted to be charged with clay, plungers for pushing the clay out of said members, a liquid pump for moving the plungers forward alternately independently of each other, and another liquid pump for retracting the plungers alternately independently of each other materially faster than they are moved forward.

11. Apparatus for extruding a column of plastic clay for segregation into a plurality of separate bats of uniform volume for making pottery ware of uniform character, comprising a tubular member for housing a body of plastic clay and having a discharge opening at its forward end, a plunger in said tubular member, a piston for moving said plunger forward to extrude clay through said discharge opening, an hydraulic cylinder housing the piston, a continuously operating liquid pump, conduit means conducting substantially all of the liquid output of the pump to the back of said cylinder to force the piston and plunger forward, and means for maintaining the volumetric delivery of the pump constant regardless of varying pressures on the liquid in the cylinder whereby said liquid output is delivered to the cylinder at a uniform rate continuously.

12. Apparatus for extruding a column of plastic clay for segregation into a plurality of separate bats of uniform volume for making pottery ware of uniform character, comprising a tubular member for housing a body of plastic clay and having a discharge opening at its forward end, a plunger in said tubular member, a piston for moving said plunger forward to extrude clay through said discharge opening, an hydraulic cylinder housing the piston, a continuously operating liquid pump, and means for delivering substantially all of said liquid from the pump to the back of said cylinder at a uniform rate by maintaining the leakage of the pump constant regardless of varying pressures on the liquid in the cylinder.

13. Continuously operating clay feeding apparatus for extruding plastic clay for segregation into a plurality of separate bats of uniform volume for making pottery ware of uniform character, comprising a pair of tubular members for housing plastic clay and each having a discharge opening at its forward end, a plunger in each of said tubular members, a piston for moving each plunger forward to extrude clay through the adjacent discharge opening, an hydraulic cylinder housing each piston, a continuously operating liquid pump, a valve for connecting the pump alternately with each cylinder, conduit means conducting substantially all of the liquid output of the pump to the back of the cylinder with which the pump is in communication to thereby force the piston and plunger forward, means for maintaining the pump operating at a constant pressure regardless of varying pressures on the liquid in the cylinders whereby said liquid output is delivered to the cylinders at a uniform rate continuously, and means actuated when a piston reaches the forward limit of its stroke in either cylinder for tripping said valve to connect the pump with the other cylinder.

14. Apparatus for feeding plastic clay to cut-off mechanism at a uniform rate for making pottery ware of uniform characters, comprising a tubular member adapted to be charged with plastic material, a plunger for pushing said material out of one end of said member, a piston for moving the plunger, an hydraulic cylinder housing the piston, a pump for pumping liquid into said cylinder to force the plunger forward, a valve casing provided with a passage through which said liquid is pumped to said cylinder, means in said casing responsive to the pressure of the liquid delivered to the casing for varying the size of the passage, said means being positioned in said casing to maintain the pressure on the liquid between the pump and valve casing greater than on the liquid leaving the valve casing whereby to maintain the volumetric delivery of the pump substantially constant regardless of varying pressures on the liquid between the valve casing and said cylinder.

15. Apparatus for feeding plastic clay to cut-off mechanism at a uniform rate for making pottery ware of uniform character, comprising a tubular member adapted to be charged with plastic material, a plunger for pushing said material out of one end of said member, a piston for moving the plunger, an hydraulic cylinder housing the piston, a pump for pumping liquid into said cylinder to force the plunger forward, a valve casing provided with a passage through which said liquid is pumped to said cylinder, a valve plunger in said casing for varying the size of the passage, and a spring at one end of said valve plunger urging it toward passage-closing position, said casing being provided on the pump side with a duct admitting the liquid from the pump to the opposite end of said plunger, and said spring holding the valve plunger in such position that the pressure on the liquid between the pump and valve casing is maintained greater than on the liquid leaving the valve casing.

16. Apparatus for feeding plastic clay to cut-off mechanism at a uniform rate for making pottery ware of uniform character, comprising a tubular member adapted to be charged with plastic material, a plunger for pushing said material out of one end of said member, a piston for moving the plunger, an hydraulic cylinder housing the piston, a source of hydraulic pressure for delivering a liquid to said cylinder to force the plunger forward, and pressure control means through which substantially all of the liquid is delivered to said cylinder for maintaining a fluid pressure between said liquid source and said control means that is enough higher than the maximum pressure required to move said piston that the fluid pressure between said control means and said source remains constant irrespective of variations in back pressure produced by said piston.

17. A fluid control for use with a fluid pump operating at a constant speed and displacement, said control comprising a valve casing provided with a passage for the flow therethrough of fluid from the pump, a valve plunger in said casing for varying the size of the passage, and a spring at one end of said plunger urging it toward passage-closing position, said casing being provided on its inlet side with a duct for admitting fluid from the pump to the opposite end of the plunger, and said spring holding said plunger in such position that the pressure on the fluid on the inlet side of the casing is maintained greater than on the fluid leaving the casing, whereby the fluid pressure on the inlet side of the control can be maintained constant in spite of variations in pressure on the fluid leaving the control.

WALTER H. EMERSON.
WILLIAM C. DENISON, Jr.